US008422402B2

(12) United States Patent
Archer et al.

(10) Patent No.: US 8,422,402 B2
(45) Date of Patent: Apr. 16, 2013

(54) BROADCASTING A MESSAGE IN A PARALLEL COMPUTER

(75) Inventors: Charles J. Archer, Rochester, MN (US); Ahmad A. Faraj, Rochester, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/060,492

(22) Filed: Apr. 1, 2008

(65) Prior Publication Data

US 2009/0245134 A1 Oct. 1, 2009

(51) Int. Cl.
*H04L 12/28* (2006.01)
*H04L 12/56* (2006.01)

(52) U.S. Cl.
USPC .......................................... 370/256; 370/390

(58) Field of Classification Search .................. 370/254, 370/256, 390
See application file for complete search history.

(56) References Cited

U.S. PATENT DOCUMENTS

| | | | |
|---|---|---|---|
| 4,715,032 A | | 12/1987 | Nilsson |
| 4,843,540 A | * | 6/1989 | Stolfo .............................. 712/11 |
| 5,105,424 A | | 4/1992 | Flaig et al. |
| 5,333,279 A | | 7/1994 | Dunning |
| 5,513,371 A | | 4/1996 | Cypher et al. |
| 5,541,914 A | | 7/1996 | Krishnamoorthy et al. |
| 5,617,538 A | | 4/1997 | Heller |
| 5,668,815 A | | 9/1997 | Gittinger et al. |
| 5,721,828 A | | 2/1998 | Frisch |
| 5,822,604 A | | 10/1998 | Ogasawara et al. |
| 5,832,215 A | | 11/1998 | Kato et al. |
| 5,864,712 A | | 1/1999 | Carmichael et al. |
| 5,878,241 A | | 3/1999 | Wilkinson et al. |
| 5,892,923 A | | 4/1999 | Yasuda et al. |
| 5,937,202 A | | 8/1999 | Crosetto et al. |
| 5,949,988 A | | 9/1999 | Feisullin et al. |
| 5,958,017 A | | 9/1999 | Scott et al. |
| 6,000,024 A | | 12/1999 | Maddox et al. |

(Continued)

FOREIGN PATENT DOCUMENTS

EP 1835414 A2 9/2007

OTHER PUBLICATIONS

"DADO: A Tree-Structured Machine Architecture for Production Systems", Stolfo et al. AAAI Proceedings, 1982, Columbia University.*

(Continued)

*Primary Examiner* — Dang Ton
*Assistant Examiner* — Ryan Kavleski
(74) *Attorney, Agent, or Firm* — Biggers & Ohanian LLP

(57) ABSTRACT

Methods, systems, and products are disclosed for broadcasting a message in a parallel computer that includes: transmitting, by the logical root to all of the nodes directly connected to the logical root, a message; and for each node except the logical root: receiving the message; if that node is the physical root, then transmitting the message to all of the child nodes except the child node from which the message was received; if that node received the message from a parent node and if that node is not a leaf node, then transmitting the message to all of the child nodes; and if that node received the message from a child node and if that node is not the physical root, then transmitting the message to all of the child nodes except the child node from which the message was received and transmitting the message to the parent node.

12 Claims, 9 Drawing Sheets

U.S. PATENT DOCUMENTS

| | | | |
|---|---|---|---|
| 6,067,609 | A | 5/2000 | Meeker et al. |
| 6,076,131 | A | 6/2000 | Nugent |
| 6,108,692 | A | 8/2000 | Van Seters et al. |
| 6,212,617 | B1 | 4/2001 | Hardwick |
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,449,667 | B1* | 9/2002 | Ganmukhi et al. ............. 710/28 |
| 6,480,885 | B1 | 11/2002 | Olivier |
| 6,691,101 | B2 | 2/2004 | MacNicol et al. |
| 6,714,552 | B1 | 3/2004 | Cotter |
| 6,742,063 | B1 | 5/2004 | Hellum et al. |
| 6,754,211 | B1 | 6/2004 | Brown |
| 6,834,301 | B1 | 12/2004 | Hanchett |
| 6,914,606 | B2 | 7/2005 | Amemiya et al. |
| 6,982,960 | B2 | 1/2006 | Lee et al. |
| 7,133,359 | B2 | 11/2006 | Weis |
| 7,263,598 | B2 | 8/2007 | Ambuel |
| 7,284,033 | B2 | 10/2007 | Jhani |
| 7,352,739 | B1 | 4/2008 | Rangarajan et al. |
| 7,496,699 | B2 | 2/2009 | Pope et al. |
| 7,539,989 | B2 | 5/2009 | Blackmore et al. |
| 7,555,566 | B2 | 6/2009 | Blumrich et al. |
| 7,590,983 | B2 | 9/2009 | Neiman et al. |
| 7,613,134 | B2 | 11/2009 | Rangaraajan et al. |
| 7,664,110 | B1 | 2/2010 | Lovett et al. |
| 7,673,011 | B2 | 3/2010 | Archer et al. |
| 7,697,443 | B2 | 4/2010 | Archer et al. |
| 7,725,329 | B2 | 5/2010 | Kil et al. |
| 7,796,527 | B2 | 9/2010 | Archer et al. |
| 7,835,378 | B2 | 11/2010 | Wijnands et al. |
| 7,853,639 | B2 | 12/2010 | Archer et al. |
| 7,948,999 | B2 | 5/2011 | Blocksome et al. |
| 8,161,268 | B2 | 4/2012 | Faraj |
| 2002/0016901 | A1 | 2/2002 | Carvey et al. |
| 2002/0054051 | A1 | 5/2002 | Ladd |
| 2002/0065984 | A1 | 5/2002 | Thompson et al. |
| 2002/0091819 | A1 | 7/2002 | Melchione et al. |
| 2002/0144027 | A1 | 10/2002 | Schmisseur |
| 2003/0182376 | A1 | 9/2003 | Smith |
| 2003/0188054 | A1 | 10/2003 | Yosimoto et al. |
| 2003/0212877 | A1 | 11/2003 | Dally et al. |
| 2004/0034678 | A1 | 2/2004 | Kuszmaul et al. |
| 2004/0073590 | A1 | 4/2004 | Bhanot et al. |
| 2005/0094577 | A1 | 5/2005 | Ashwood-Smith |
| 2005/0165980 | A1 | 7/2005 | Clayton et al. |
| 2005/0243711 | A1 | 11/2005 | Alicherry et al. |
| 2006/0168359 | A1 | 7/2006 | Bissessur et al. |
| 2006/0179181 | A1 | 8/2006 | Seong |
| 2006/0277323 | A1 | 12/2006 | Joublin et al. |
| 2007/0110063 | A1* | 5/2007 | Tang et al. .................... 370/390 |
| 2007/0174558 | A1 | 7/2007 | Jia et al. |
| 2007/0242611 | A1 | 10/2007 | Archer et al. |
| 2007/0245122 | A1 | 10/2007 | Archer et al. |
| 2007/0288935 | A1 | 12/2007 | Tannenbaum et al. |
| 2008/0077366 | A1 | 3/2008 | Neuse et al. |
| 2008/0127146 | A1 | 5/2008 | Liao et al. |
| 2008/0201603 | A1 | 8/2008 | Ritz et al. |
| 2008/0301683 | A1 | 12/2008 | Archer et al. |
| 2009/0006662 | A1 | 1/2009 | Chen et al. |
| 2009/0064176 | A1 | 3/2009 | Ohly et al. |
| 2009/0067334 | A1 | 3/2009 | Archer et al. |
| 2009/0154486 | A1 | 6/2009 | Archer et al. |
| 2009/0196361 | A1 | 8/2009 | Chan et al. |
| 2009/0240838 | A1 | 9/2009 | Berg et al. |
| 2009/0292905 | A1 | 11/2009 | Faraj |
| 2010/0122268 | A1 | 5/2010 | Jia |
| 2010/0185718 | A1 | 7/2010 | Archer et al. |
| 2011/0119673 | A1 | 5/2011 | Bloch et al. |
| 2011/0179134 | A1 | 7/2011 | Mayo et al. |

OTHER PUBLICATIONS

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

U.S. Appl. No. 60/271,124, filed Feb. 24, 2001, pp. 12-13, 27 and 42-43.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.

Fisher, et al.; "Computing the Hough Transform on a Scar Line Array Processor"; IEEE Transactions on Pattern Analysis and Machine Intelligence; vol. II, No. 3; Mar. 1989; pp. 262-265.

Office Action, U.S. Appl. No. 11/279,620, USPTO Mail Date Mar. 4, 2008.

Office Action, U.S. Appl. No. 11/279,620, USPTO Mail Date Sep. 3, 2008.

Office Action, U.S. Appl. No. 11/279,620, USPTO Mail Date Dec. 29, 2008.

Office Action, U.S. Appl. No. 11/769,367, USPTO Mail Date Apr. 3, 2009.

Office Action, U.S. Appl. No. 11/459,387, USPTO Mail Date Dec. 13, 2007.

Office Action, U.S. Appl. No. 11/459,387, USPTO Mail Date Jul. 11, 2008.

Office Action, U.S. Appl. No. 11/459,387, USPTO Mail Date Mar. 18, 2009.

Office Action, U.S. Appl. No. 11/737,286, USPTO Mail Date Feb. 9, 2009.

Office Action, U.S. Appl. No. 11/737,209, USPTO Mail Date Jul. 20, 2009.

Office Action, U.S. Appl. No. 11/843,090, USPTO Mail Date Sep. 4, 2009.

Office Action, U.S. Appl. No. 11/754,740, USPTO Mail Date Apr. 11, 2011.

Final Office Action, U.S. Appl. No. 12/124,756, USPTO Mail Date Mar. 28, 2011.

Edmonds, "AM++: A Generalized Active Message Framework," pp. 1-10, Sep. 2010.

Bangalore. "Extending the Message Passing Interface (MPI)", Proc. of the 1994 Conf. on Scalable Parallel Libraries, IEEE, pp. 106-118, 1995.

Bafna, "Coprocessor Design to Support MPI Primitives in Configurable Mutliprocessors;" Integration, the VSLI Journal, vol. 40 , Issue 3 , pp. 235-252, Apr. 2007.

Keller, Rainer; "MPI Development Tools and Applications for the Grid," Jun. 2003, pp. 1-12.

Tang, Hong; "Optimizing threaded MPI execution on SMP clusters," International Conference on Supercomputer, Jun. 2001, pp. 381-392.

http://betterexplained.com/articles/swap-two-variables-using-xor, Jan. 16, 2007, betterexplained.com.

Office Action, U.S. Appl. No. 11/754,782, USPTO Mail Date Jun. 23, 2011.

Final Office Action, U.S. Appl. No. 12/053,842, USPTO Mail Date May 23, 2011.

Office Action, U.S. Appl. No. 12/176,816, USPTO Mail Date Jun. 10, 2011.

M. Matsuda, T. Koduh, Y. Kodama, R. Takano, Y. Ishikawa, "Efficient MPI Collective Operations for Clusters in Long-and-Fast Networks," cluster, pp. 1-9, 2006 IEEE International Conference on Cluster Computing, Sep. 2006.

DADO: A Tree-Structured Machine Architecture for Production Systems, Stolfo et al. AAAI Proceedings, 1982, Columbia University.
Eunseuk Oh, An All-Reduce Operation in Star Networks Using All-to-All Broadcast Communication Patterns, 2005, 1-8.
Xin Yuan, Bandwidth Efficient All-reduce Operation on Tree Topologies, 2001, 1-8.
Final Office Action, U.S. Appl. No. 11/769,367, USPTO Mail Date Sep. 28, 2010.
Final Office Action, U.S. Appl. No. 12/053,842, USPTO Mail Date Oct. 18, 2010.
Advisory Action, U.S. Appl. No. 12/053,842, USPTO Mail Date Jan. 11, 2011.
Office Action, U.S. Appl. No. 12/053,842, USPTO Mail Date Mar. 1, 2011.
Office Action, U.S. Appl. No. 12/503,902, USPTO Mail Date Oct. 6, 2010.
Office Action, U.S. Appl. No. 12/060,492, USPTO Mail Date May 27, 2010.
Final Office Action, U.S. Appl. No. 12/060,492, USPTO Mail Date Dec. 2, 2010.
Office Action, U.S. Appl. No. 12/124,763, USPTO Mail Date Oct. 14, 2010.
Office Action, U.S. Appl. No. 12/124,756, USPTO Mail Date Oct. 18, 2010.
Notice of Allowance, U.S. Appl. No. 11/754,782, USPTO Mail Date Dec. 16, 2011.
Notice of Allowance, U.S. Appl. No. 11/754,740, USPTO Mail Date Nov. 8, 2011.
Notice of Allowance, U.S. Appl. No. 12/053,842, USPTO Mail Date Oct. 14, 2011.
Office Action, U.S. Appl. No. 12/060,492, USPTO Mail Date Jul. 16, 2012.
Notice of Allowance, U.S. Appl. No. 12/124,756, USPTO Mail Date Dec. 14, 2011.
Office Action, U.S. Appl. No. 12/124,745, USPTO Mail Date Jun. 15, 2012.
Office Action, U.S. Appl. No. 12/770,286, USPTO Mail Date Jul. 5, 2012.
Office Action, U.S. Appl. No. 12/760,020, USPTO Mail Date Feb. 13, 2012.
Notice of Allowance, U.S. Appl. No. 12/760,020, USPTO Mail Date Jul. 30, 2012.
Notice of Allowance, U.S. Appl. No. 12/124,763, USPTO Mail Date Oct. 3, 2012.
Final Office Action, U.S. Appl. No. 12/124,745, USPTO Mail Date Nov. 23, 2012.
Office Action, U.S. Appl. No. 12/748,594, USPTO Mail Date Sep. 14, 2012.
Office Action, U.S. Appl. No. 13/585,993, USPTO Mail Date Oct. 11, 2012.
U.S. Appl. No. 13/672,740, USPTO Mail Date Nov. 9, 2012.
U.S. Appl No. 13/666,221, USPTO Mail Date Nov. 1, 2012.

* cited by examiner

BROADCASTING A MESSAGE IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for broadcasting a message in a parallel computer.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory needed for message buffers and latency in the data communications among nodes. Designs of parallel computers use specially designed data communications links so that the communication overhead will be small but it is the parallel algorithm that decides the volume of the traffic.

Many data communications network topologies are used for message passing among nodes in parallel computers. Such network topologies may include for example, a tree, a rectangular mesh, and a torus. In a tree network, the nodes typically are connected into a binary tree: each node typically has a parent and two children (although some nodes may only have zero children or one child, depending on the hardware configuration). A tree network typically supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. The tree network, however, does not lend itself to and is typically inefficient for point-to-point operations.

A rectangular mesh topology connects compute nodes in a three-dimensional mesh, and every node is connected with up to six neighbors through this mesh network. Each compute node in the mesh is addressed by its x, y, and z coordinate. A torus network connects the nodes in a manner similar to the three-dimensional mesh topology, but adds wrap-around links in each dimension such that every node is connected to its six neighbors through this torus network. In computers that use a torus and a tree network, the two networks typically are implemented independently of one another, with separate routing circuits, separate physical links, and separate message buffers. Other network topology often used to connect nodes of a network includes a star, a ring, or a hypercube. While the tree network generally lends itself to collective operations, a mesh or a torus network generally lends itself well for point-to-point communications. Although in general each type of network is optimized for certain communications patterns, those communications patterns may generally be supported by any type of network.

As mentioned above, the tree network is optimized for collective operations. Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

The collective tree network supports efficient collective operations because of the low latency associated with propagating a logical root's message to all of the other nodes in the collective tree network. The low latency for such data transfers result from the collective tree network's ability to multicast data from the physical root of the tree to the leaf nodes of the tree. The physical root of the collective tree network is the node at the top of the physical tree topology and is physically configured to only have child nodes without a parent node. In contrast, the leaf nodes are nodes at the bottom of the tree topology and are physically wired to only have a parent node without any children nodes. Currently, when the logical root is ready to broadcast a message to the other nodes in the operational group, the logical root must first send the entire message to the physical root of the tree network, which in turn, multicasts the entire message down the tree network to all the nodes in the operational group. The drawback to this current mechanism is that the initial step of sending the entire message from the logical root to the physical root before any of the other nodes receive the message may delay the propagation of the message to all of the nodes in the operational group.

SUMMARY OF THE INVENTION

Methods, systems, and products are disclosed for broadcasting a message in a parallel computer. The parallel computer includes a plurality of nodes connected together using a multicast data communications network optimized for collective operations. One node is configured as a physical root. The nodes are organized into at least one operational group of nodes for collective parallel operations, and one node is assigned to be a logical root. Broadcasting a message in a parallel computer includes: transmitting, by the logical root to all of the nodes in the operational group directly connected to the logical root, a message; and for each node in the operational group except the logical root: receiving, by that node, the message; if that node is the physical root, then transmitting, by that node, the message to all of the child nodes of the physical root except the child node from which the message was received; if that node received the message from the parent node for that node and if that node is not a leaf node, then transmitting, by that node, the message to all of the child nodes of that node; and if that node received the message from a child node and if that node is not the physical root, then transmitting, by that node, the message to all of the child nodes of that node except the child node from which the message was received and transmitting the message to the parent node of that node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
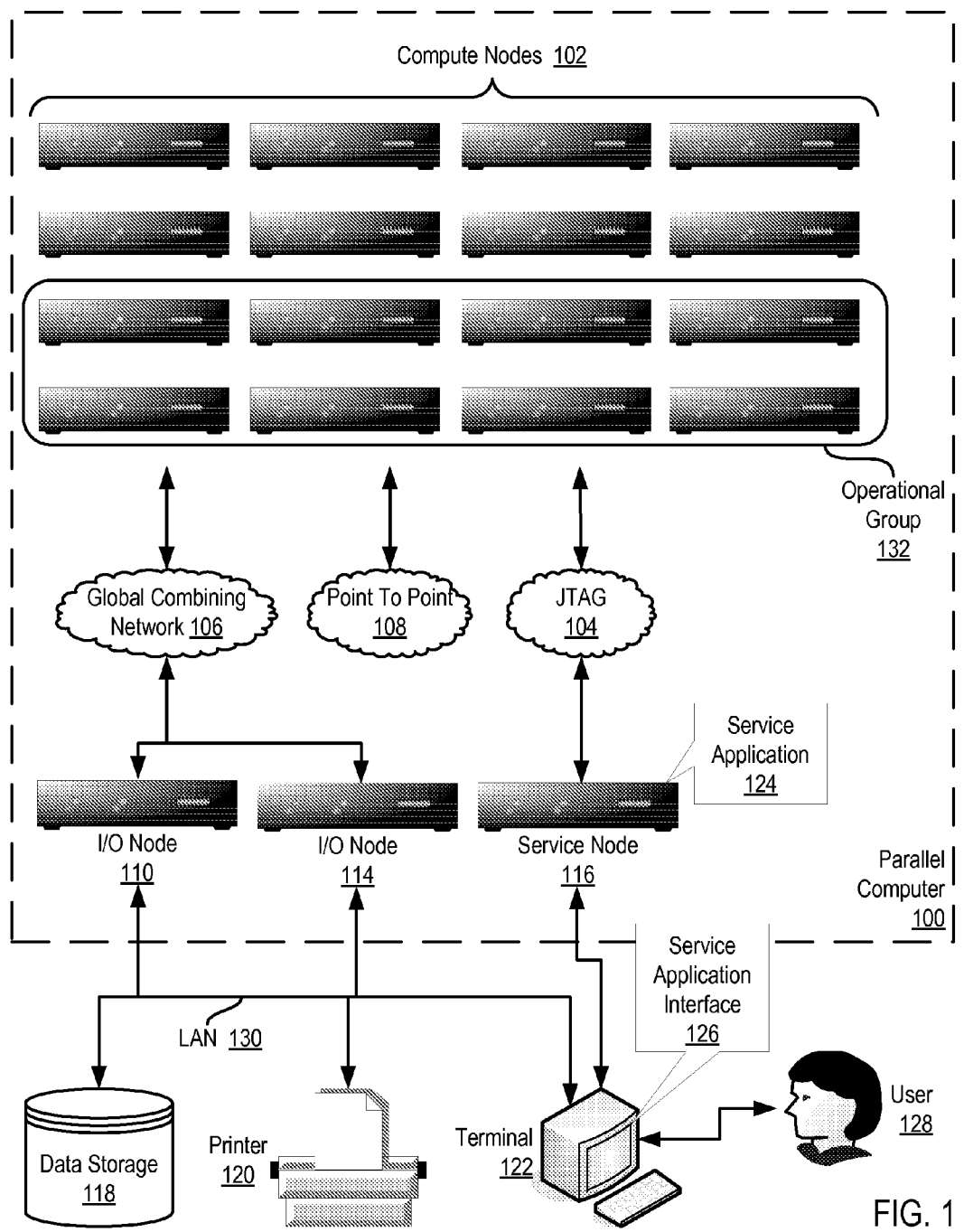
FIG. 1 illustrates an exemplary parallel computer for broadcasting a message in a parallel computer according to embodiments of the present invention.

Exemplary methods, systems, and computer program products for broadcasting a message in a parallel computer according to embodiments of the present invention are described with reference to the accompanying drawings, beginning with FIG. 1. FIG. 1 illustrates an exemplary parallel computer for broadcasting a message in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a rectangular mesh or torus network (108) which is optimized point to point operations. The rectangular mesh or torus network (108) is characterized by at least two dimensions. The global combining network (106) is a multicast data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose send buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) of FIG. 1 operates generally for broadcasting a message in a parallel computer according to embodiments of the present invention. The parallel computer (100) of FIG. 1 operates generally for broadcasting a message in a parallel computer according to embodiments of the present invention by: transmitting, by a logical root to all of the compute nodes in the operational group directly connected to the logical root, a message for broadcasting to all of the compute nodes in the operational group; and for each compute node in the operational group except the logical root: receiving, by that compute node, the message for broadcasting to all of the compute nodes in the operational group; if that compute node is the physical root, then transmitting, by that compute node, the message to all of the child nodes of the physical root except the child node from which the message was received; if that compute node received the message from the parent node for that compute node and if that compute node is not a leaf node, then transmitting, by that compute node, the message to all of the child nodes of that compute node; and if that compute node received the message from a child node and if that compute node is not the physical root, then transmitting, by that compute node, the message to all of the child nodes of that compute node except the child node from which the message was received and transmitting the message to the parent node of that compute node. The message broadcast by the logical root may be implemented as the logical root's contribution to a collective operation such as, for example, an all-to-all operation, an allgather operation, and so on.

The arrangement of nodes, networks, and I/O devices making up the exemplary system illustrated in FIG. 1 are for explanation only, not for limitation of the present invention. Data processing systems capable of broadcasting a message in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Broadcasting a message in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of broadcasting a message in a parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152).

Stored in RAM (156) is an application (158), a module of computer program instructions that carries out parallel, user-level data processing using parallel algorithms. Also stored in RAM (156) is a messaging module (160), a library of computer program instructions that carry out parallel communications among compute nodes, including point to point operations as well as collective operations. Application (158) executes point to point and collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

The application (158) or the messaging module (160) may include computer program instructions for broadcasting a message in a parallel computer according to embodiments of the present invention. The application (158) or the messaging module (160) may operate generally for broadcasting a message in a parallel computer according to embodiments of the present invention by: transmitting, by a logical root to all of the compute nodes in the operational group directly connected to the logical root, a message for broadcasting to all of the compute nodes in the operational group; and for each compute node in the operational group except the logical root: receiving, by that compute node, the message for broadcasting to all of the compute nodes in the operational group; if that compute node is the physical root, then transmitting, by that compute node, the message to all of the child nodes of the physical root except the child node from which the message was received; if that compute node received the message from the parent node for that compute node and if that compute node is not a leaf node, then transmitting, by that compute node, the message to all of the child nodes of that compute node; and if that compute node received the message from a child node and if that compute node is not the physical root, then transmitting, by that compute node, the message to all of the child nodes of that compute node except the child node from which the message was received and transmitting the message to the parent node of that compute node.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG.

2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
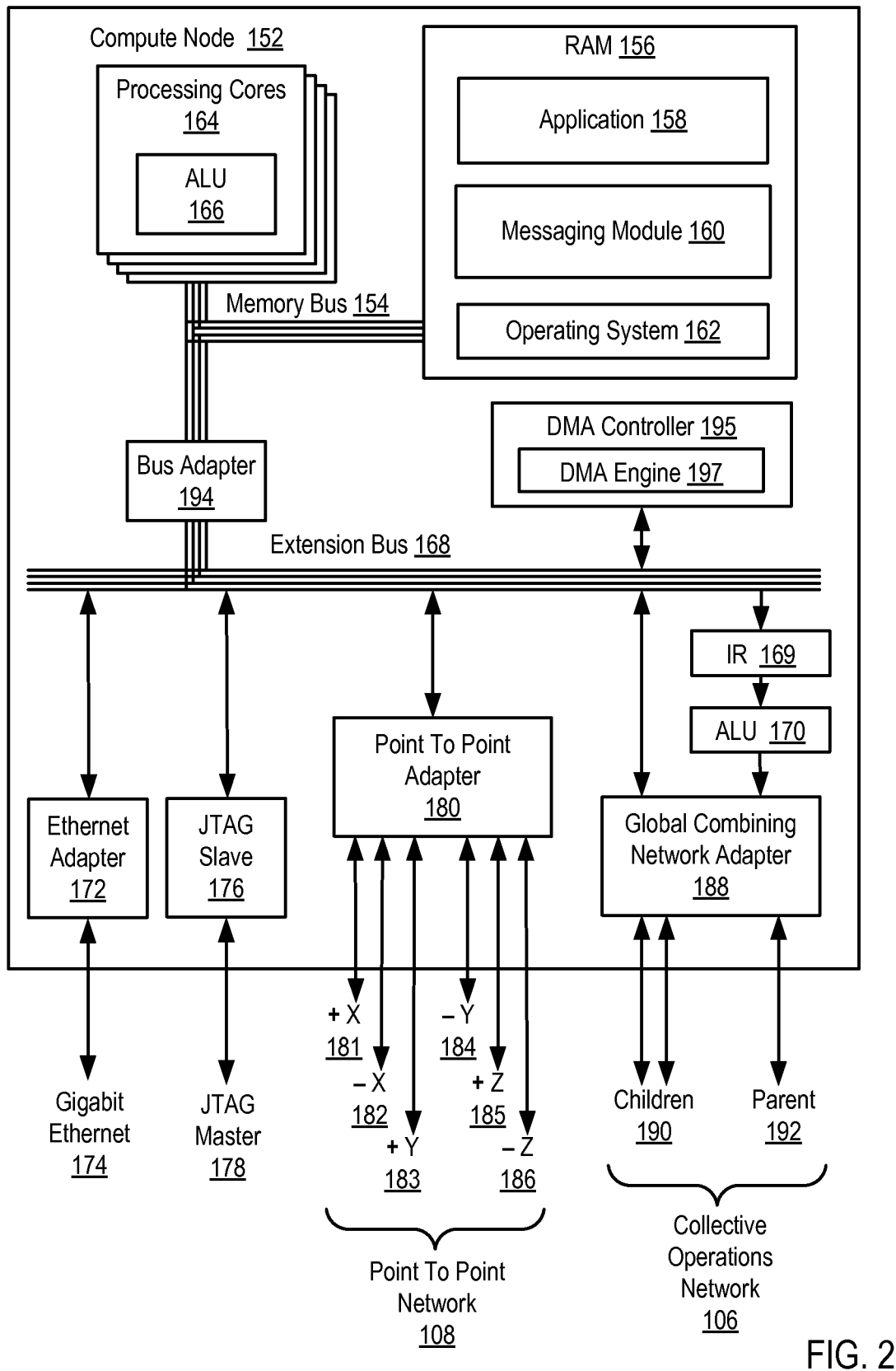
FIG. 2 sets forth a block diagram of an exemplary compute node useful in a parallel computer capable of broadcasting a message in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for broadcasting a message in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in broadcasting a message in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
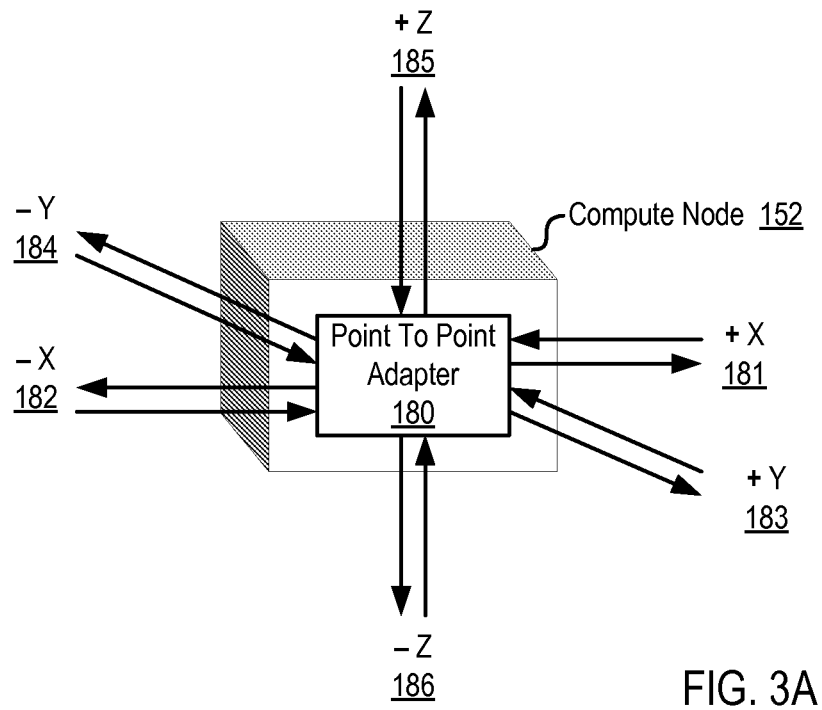
FIG. 3A illustrates an exemplary Point To Point Adapter useful in a parallel computer capable of broadcasting a message in a parallel computer according to embodiments of the present invention.

For further explanation, FIG. 3A illustrates an exemplary Point To Point Adapter (180) useful in a parallel computer capable of broadcasting a message in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
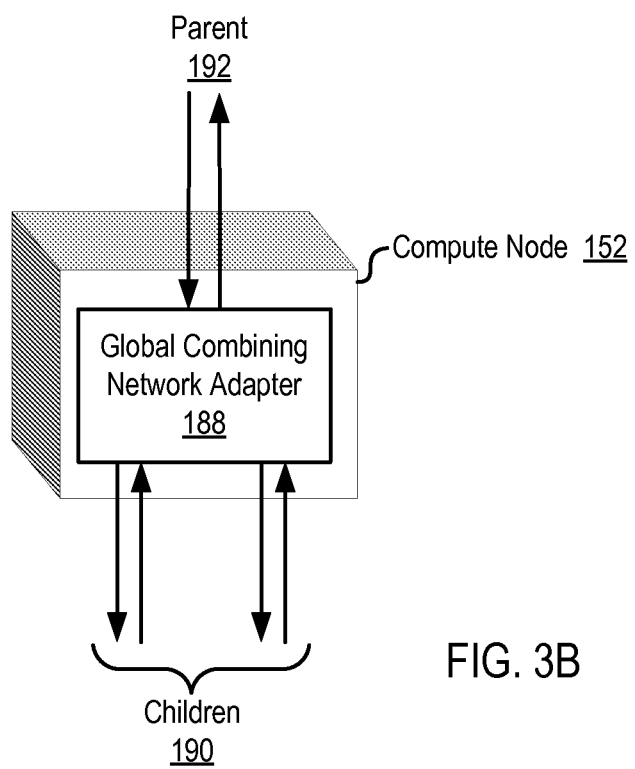
FIG. 3B illustrates an exemplary Global Combining Network Adapter useful in a parallel computer capable of broadcasting a message in a parallel computer according to embodiments of the present invention.

For further explanation, FIG. 3B illustrates an exemplary Global Combining Network Adapter (188) useful in a parallel computer capable of broadcasting a message in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
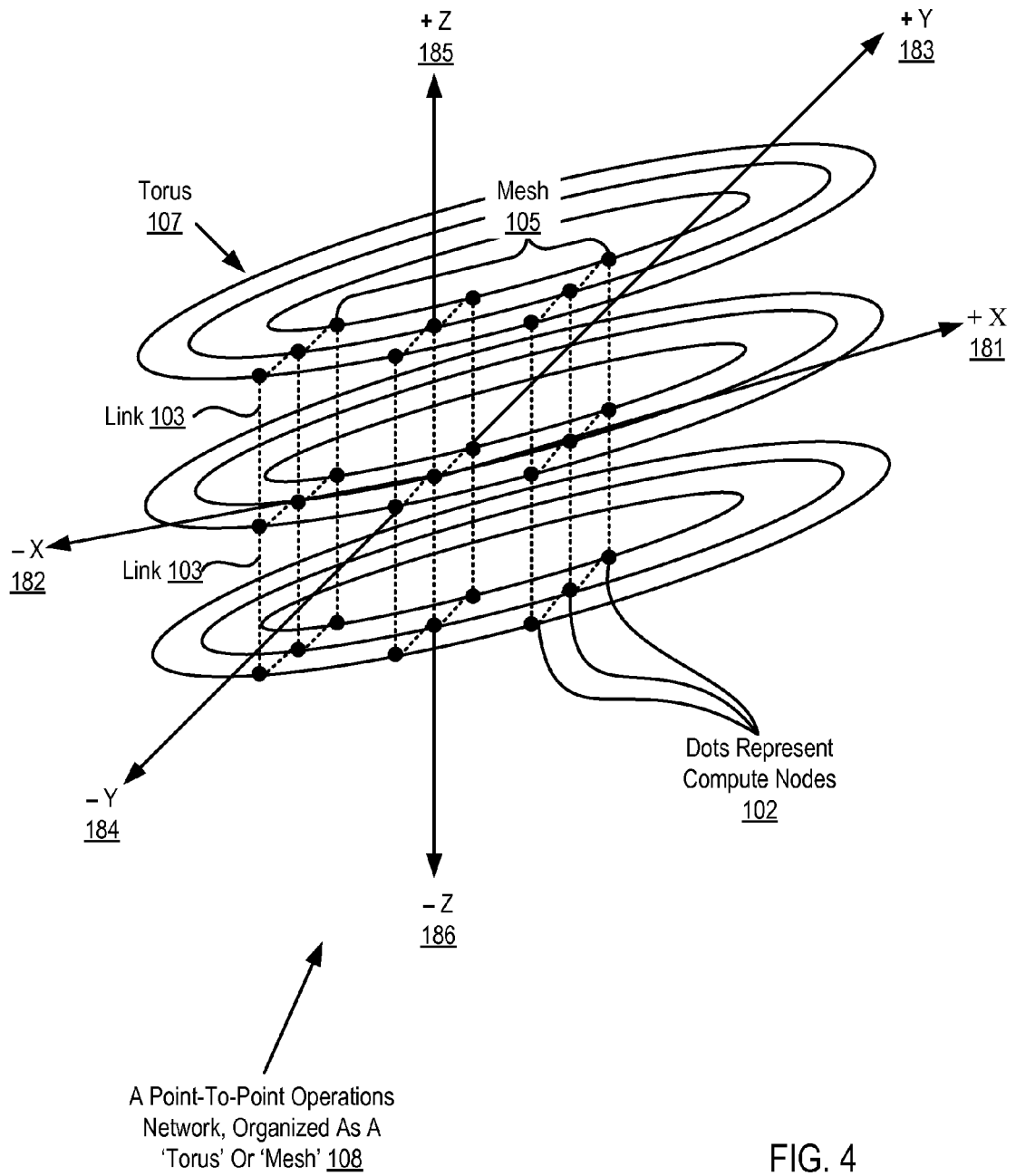
FIG. 4 sets forth a line drawing illustrating an exemplary data communications network optimized for point to point operations useful in a parallel computer capable of broadcasting a message in a parallel computer according to embodiments of the present invention.

For further explanation, FIG. 4 sets forth a line drawing illustrating an exemplary data communications network (108) optimized for point to point operations useful in a parallel computer capable of broadcasting a message in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in broadcasting a message in a parallel computer in accordance with embodiments of the present invention may contain only a few compute nodes or may contain thousands of compute nodes.

Figure 5:
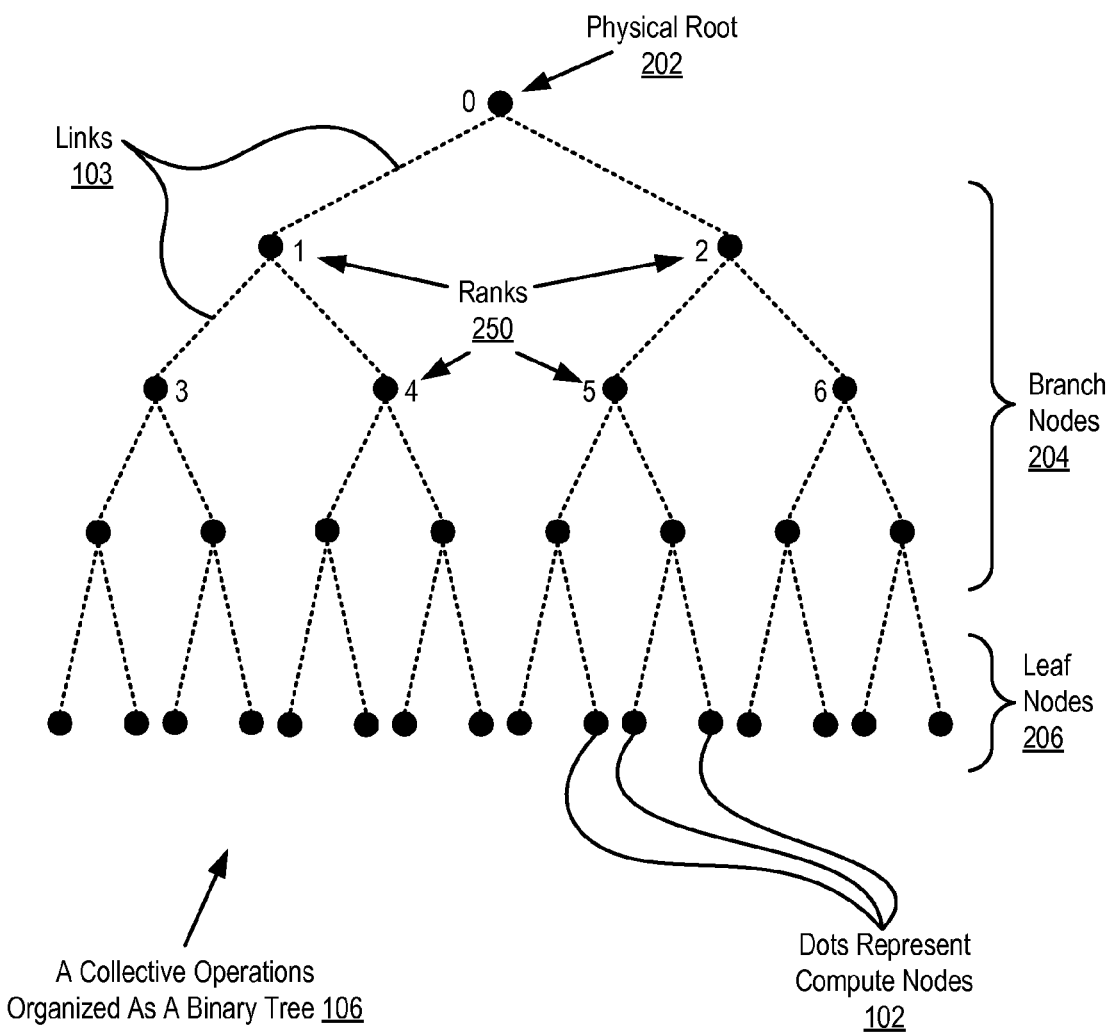
FIG. 5 sets forth a line drawing illustrating an exemplary data communications network optimized for collective operations useful in a parallel computer capable of broadcasting a message in a parallel computer according to embodiments of the present invention.

For further explanation, FIG. 5 sets forth a line drawing illustrating an exemplary data communications network (106) optimized for collective operations useful in a parallel computer capable of broadcasting a message in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for broadcasting a message in a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
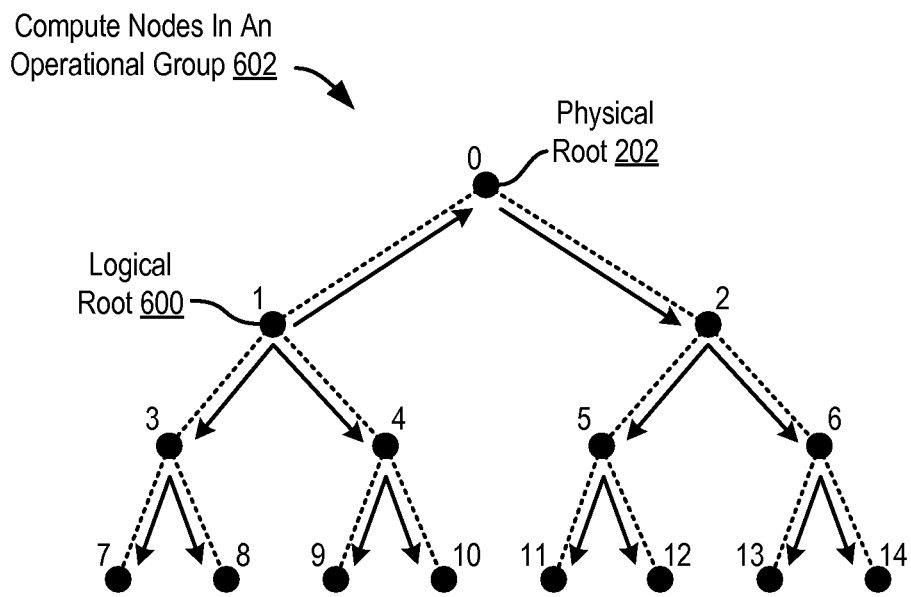
FIG. 6 sets forth a line drawing illustrating exemplary compute nodes in an operational group useful in broadcasting a message in a parallel computer according to embodiments of the present invention.

For further explanation, FIG. 6 sets forth a line drawing illustrating exemplary compute nodes in an operational group (602) useful in broadcasting a message in a parallel computer according to embodiments of the present invention. The parallel computer described with reference to FIG. 6 includes fifteen compute nodes in an operational group (602) of compute nodes for collective parallel operations of the parallel computer. The fifteen compute nodes in the operational group (602) are identified as compute nodes 0-14. Compute nodes 0-14 are connected together using a multicast data communications network optimized for collective operations. Compute node 0 is configured as a physical root in the data communications network. The physical root of the collective tree network is the node at the top of the physical tree topology and is physically configured to only have child nodes without a parent node.

In the example of FIG. 6, compute node 1 is assigned to be a logical root (600) for the operational group (602). Accordingly, the logical root (600) is neither the physical root nor a leaf node for the tree network. Compute node 1 has a message for broadcasting to the other compute nodes of the operational group (602). The logical root (600) of FIG. 6 concurrently transmits the message to all of the compute nodes in the operational group directly connected to the logical root by transmitting the message to all of the child nodes of the logical root (600) and to the parent of the logical root (600). That is, compute node 1 transmits the message to compute nodes 0, 3, and 4 concurrently.

In the example of FIG. 6, when the logical root (600) transmits the message to the nodes directly connected to the logical root (600), the message generally begins to fan out through the network in all directions away from the logical root (600). To propagate the message in all directions away from the logical root (600), each compute node in the operational group (602) except the logical root (600) operates as follows: the compute node receives the message for broadcasting to all of the compute nodes in the operational group; the compute node transmits the message to all of the child nodes of the physical root except the child node from which the message was received if the compute node is the physical root (202); the compute node transmits the message to all of the child nodes of the compute node if the compute node received the message from the parent node for the compute node; and the compute node transmits the message to all of the child nodes of the compute node except the child node from which the message was received and transmits the message to the parent node of the compute node if the compute node received the message from a child node and if the compute node is not the physical root.

For example, when compute node 3 receives the message from compute node 1, compute node 3 transmits the message to both of its child nodes, compute nodes 7 and 8. When compute node 4 receives the message from compute node 1, compute node 4 transmits the message to both of its child nodes, compute nodes 9 and 10. When compute node 0, the physical root (202), receives the message from compute node 1, compute node 0 transmits the message to its other child node, compute node 2. Upon receiving the message from compute node 0, compute node 2 transmits the message to both of its child nodes, compute nodes 5 and 6. When compute node 5 receives the message from compute node 2, compute node 5 transmits the message to both of its child nodes, compute nodes 11 and 12. When compute node 6 receives the message from compute node 2, compute node 6 transmits the message to both of its child nodes, compute nodes 13 and 14.

In the example of FIG. 6, the logical root is neither a physical root nor one of the leaf nodes in the multicast data communications network. In some other embodiments, however, the logical root may be one of the leaf nodes in the data communications network. For further explanation, FIG. 7 sets forth a line drawing illustrating exemplary compute nodes in an operational group (602) useful in broadcasting a message in a parallel computer according to embodiments of the present invention. The parallel computer described with reference to FIG. 7 includes fifteen compute nodes in an operational group (602) of compute nodes for collective parallel operations of the parallel computer. The fifteen compute nodes in the operational group (602) are identified as compute nodes 0-14. Compute nodes 0-14 are connected together using a multicast data communications network optimized for collective operations. Compute node 0 is configured as a physical root in the data communications network.

Figure 7:
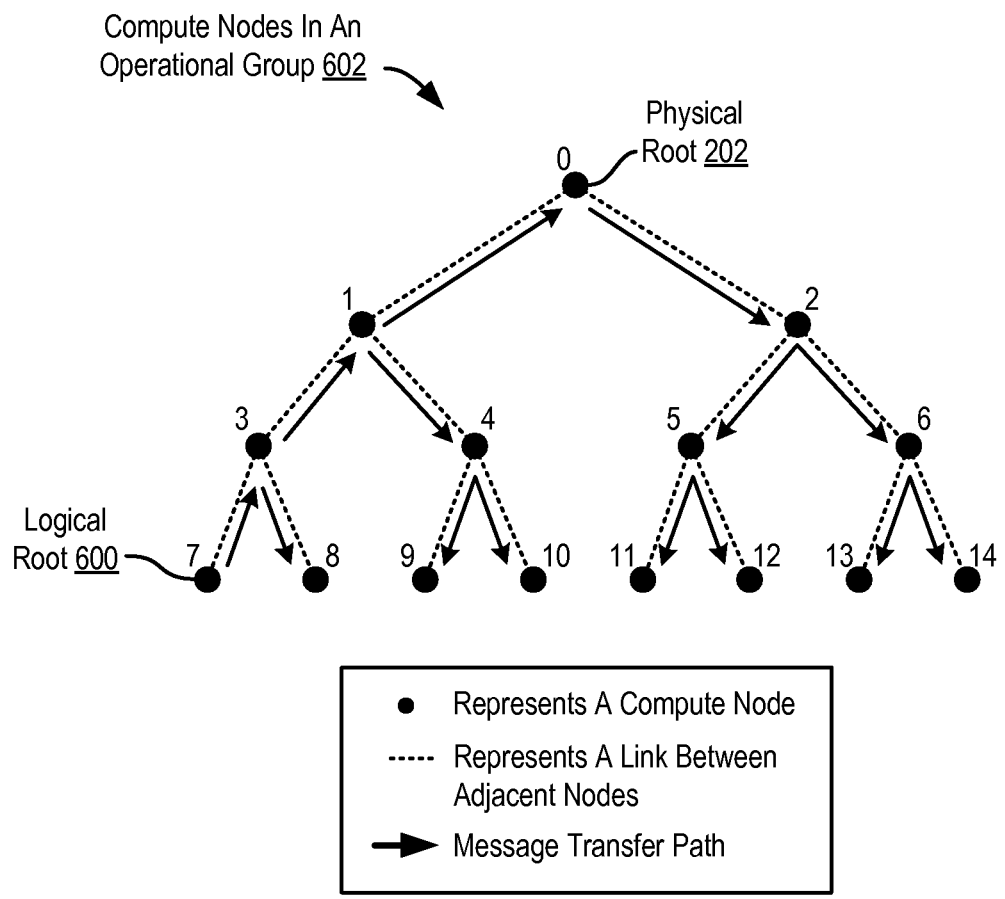
FIG. 7 sets forth a line drawing illustrating exemplary compute nodes in an operational group useful in broadcasting a message in a parallel computer according to embodiments of the present invention.

In the example of FIG. 7, compute node 7 is assigned to be a logical root (600) for the operational group (602). Accordingly, the logical root (600) is a leaf node for the tree network. Compute node 7 has a message for broadcasting to the other compute nodes of the operational group (602). As such, the logical root (600) of FIG. 7 concurrently transmits the message to the compute nodes in the operational group directly connected to the logical root (600) by transmitting the message to the parent of the logical root (600). That is, compute node 7 transmits the message to compute node 3.

In the example of FIG. 7, when the logical root (600) transmits the message to the nodes directly connected to the logical root (600), the message generally begins to fan out through the network in all directions away from the logical root (600). To propagate the message in all directions away from the logical root (600), each compute node in the operational group (602) except the logical root (600) operates as follows: the compute node receives the message for broadcasting to all of the compute nodes in the operational group; the compute node transmits the message to all of the child nodes of the physical root except the child node from which the message was received if the compute node is the physical root (202); the compute node transmits the message to all of the child nodes of the compute node if the compute node received the message from the parent node for the compute node; and the compute node transmits the message to all of the child nodes of the compute node except the child node from which the message was received and transmits the message to the parent node of the compute node if the compute node received the message from a child node and if the compute node is not the physical root.

For example, when compute node 3 receives the message from compute node 7, compute node 3 transmits the message to its other child node, compute node 8, and its parent node, compute node 1. Upon receiving the message from compute node 3, compute node 1 transmits the message to its other child node, compute node 4, and its parent node, compute node 0. When compute node 4 receives the message from compute node 1, compute node 4 transmits the message to both of its child nodes, compute nodes 9 and 10. When compute node 0, the physical root (202), receives the message from compute node 1, compute node 0 transmits the message to its other child node, compute node 2. Upon receiving the message from compute node 0, compute node 2 transmits the message to both of its child nodes, compute nodes 5 and 6. When compute node 5 receives the message from compute node 2, compute node 5 transmits the message to both of its child nodes, compute nodes 11 and 12. When compute node 6 receives the message from compute node 2, compute node 6 transmits the message to both of its child nodes, compute nodes 13 and 14.

In the example of FIG. 6, the logical root is neither a physical root nor one of the leaf nodes in the multicast data communications network. In the example of FIG. 7, the logical root is one of the leaf nodes in the data communications network. In still other embodiments, however, the logical root may be the physical root in the data communications network. For further explanation, FIG. 8 sets forth a line drawing illustrating exemplary compute nodes in an operational group (602) useful in broadcasting a message in a parallel computer according to embodiments of the present invention. The parallel computer described with reference to FIG. 8 includes fifteen compute nodes in an operational group (602) of compute nodes for collective parallel operations of the parallel computer. The fifteen compute nodes in the operational group (602) are identified as compute nodes 0-14. Compute nodes 0-14 are connected together using a multicast data communications network optimized for collective operations. Compute node 0 is configured as a physical root in the data communications network.

Figure 8:
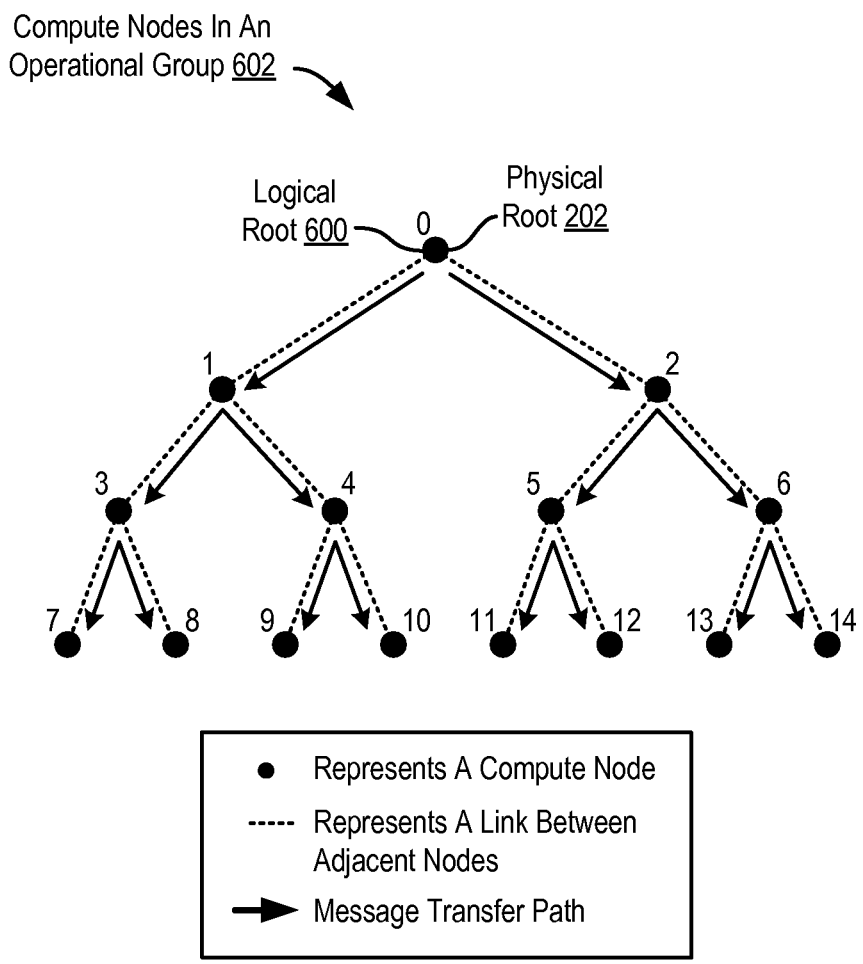
FIG. 8 sets forth a line drawing illustrating exemplary compute nodes in an operational group useful in broadcasting a message in a parallel computer according to embodiments of the present invention.

In the example of FIG. 8, compute node 0 is also assigned to be a logical root (600) for the operational group (602). Accordingly, the logical root (600) is the physical root (202) for the tree network. Compute node 0 has a message for broadcasting to the other compute nodes of the operational group (602). As such, the logical root (600) of FIG. 8 concurrently transmits the message to the compute nodes in the operational group directly connected to the logical root (600) by transmitting the message to all of the child nodes of the logical root (600). That is, compute node 0 transmits the message to compute nodes 1 and 2.

In the example of FIG. 8, when the logical root (600) transmits the message to the nodes directly connected to the logical root (600), the message generally begins to fan out through the network in all directions away from the logical root (600). To propagate the message in all directions away from the logical root (600), each compute node in the operational group (602) except the logical root (600) operates as follows: the compute node receives the message for broadcasting to all of the compute nodes in the operational group; the compute node transmits the message to all of the child nodes of the physical root except the child node from which the message was received if the compute node is the physical root (202); the compute node transmits the message to all of the child nodes of the compute node if the compute node received the message from the parent node for the compute node; and the compute node transmits the message to all of the child nodes of the compute node except the child node from which the message was received and transmits the message to the parent node of the compute node if the compute node received the message from a child node and if the compute node is not the physical root.

For example, when compute node 1 receives the message from compute node 0, compute node 1 transmits the message to both its child nodes, compute nodes 3 and 4. Upon receiving the message from compute node 1, compute node 3 transmits the message to both its child nodes, compute nodes 7 and 8. When compute node 4 receives the message from compute node 1, compute node 4 transmits the message to both of its child nodes, compute nodes 9 and 10. Upon receiving the message from compute node 0, compute node 2 transmits the message to both of its child nodes, compute nodes 5 and 6. When compute node 5 receives the message from compute node 2, compute node 5 transmits the message to both of its child nodes, compute nodes 11 and 12. When compute node 6 receives the message from compute node 2, compute node 6 transmits the message to both of its child nodes, compute nodes 13 and 14.

Figure 9:
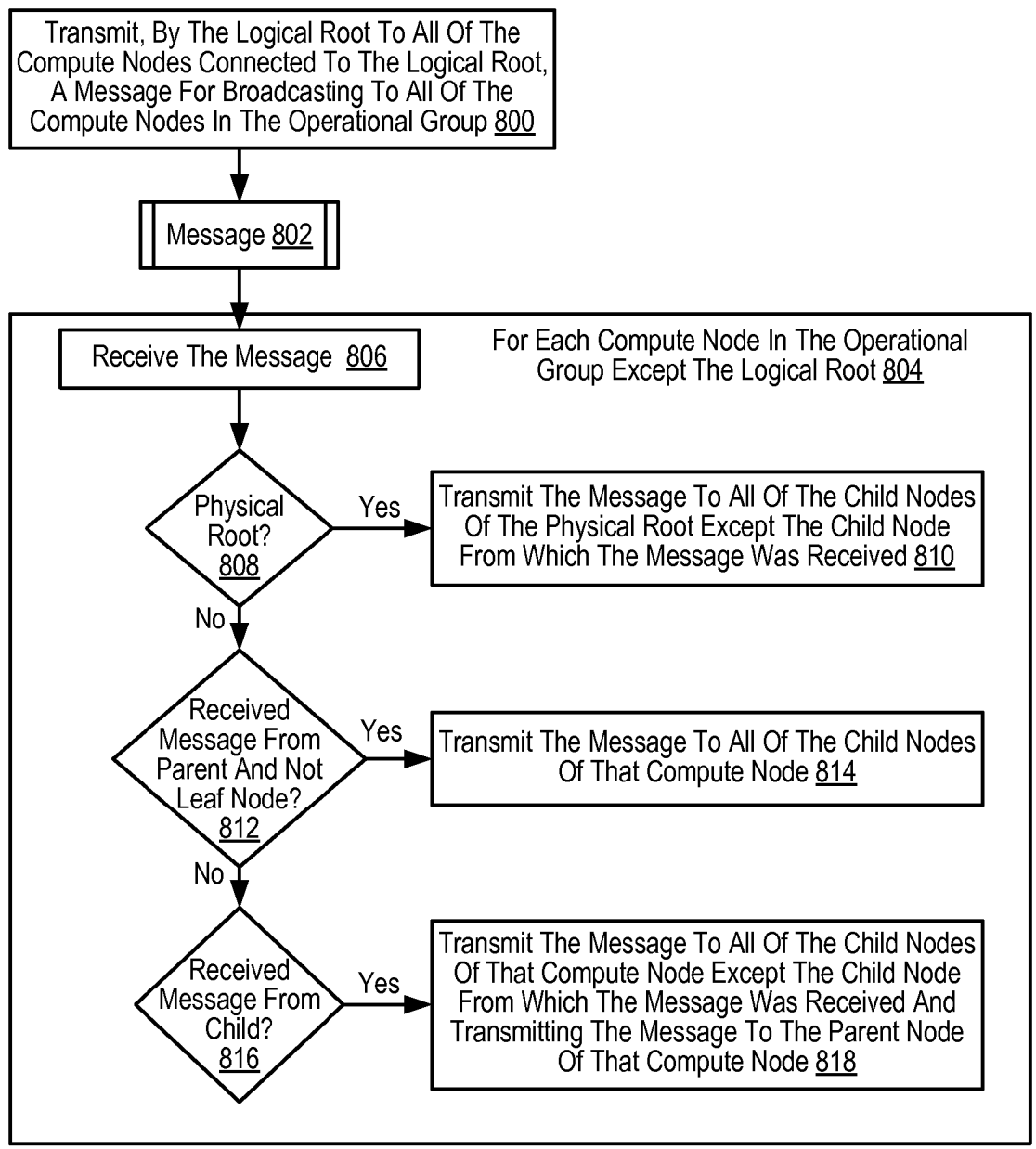
FIG. 9 sets forth a flow chart illustrating an exemplary method for broadcasting a message in a parallel computer according to embodiments of the present invention.

For further explanation, FIG. 9 sets forth a flow chart illustrating an exemplary method for broadcasting a message in a parallel computer according to embodiments of the present invention. The parallel computer described with reference to FIG. 9 includes a plurality of compute nodes connected together using a multicast data communications network. The multicast data communications network is optimized for collective operations. One compute node is configured as a physical root in the data communications network. The compute nodes of the parallel computer are organized into at least one operational group of compute nodes for collective parallel operations. One compute node is assigned to be a logical root for the operational group.

The method of FIG. 9 includes transmitting (800), by the logical root to all of the compute nodes in the operational group directly connected to the logical root, a message (802) for broadcasting to all of the compute nodes in the operational group. The nodes that are 'directly connected' to the logical root are nodes that are adjacent to the logical root in the network topology. That is, two nodes are directly connected when there is a physical link that connects the two nodes in the network without any intervening nodes. The logical root may transmit (800) the message to all of the compute nodes in the operational group directly connected to the logical root according to the method of FIG. 9 by encapsulating the message (802) into packets that are then sent along links to each of the node in the operational group that are directly connected to the logical root in the network topology.

As illustrated in FIG. 6 above, when the logical root is neither the physical root nor a leaf node, the logical root may transmit (800) the message (802) to all of the compute nodes in the operational group directly connected to the logical root according to the method of FIG. 9 by transmitting the message to all of the child nodes of the logical root and to the parent node of the logical root. As illustrated in FIG. 7 above, when the logical root is not the physical root and the logical root is a leaf node, the logical root may transmit (800) the message (802) to all of the compute nodes in the operational group directly connected to the logical root according to the method of FIG. 9 by transmitting the message to the parent of the logical root. As illustrated in FIG. 8 above, when the logical root is the physical root, the logical root may transmit (800) the message (802) to all of the compute nodes in the operational group directly connected to the logical root according to the method of FIG. 9 by transmitting the message to all of the child nodes of the logical root.

In the example of FIG. 9, when the logical root transmits the message to the nodes directly connected to the logical root, the message generally begins to fan out through the network in all directions away from the logical root. To propagate the message (802) in all directions away from the logical root in the method of FIG. 9, the following steps are performed for (804) each compute node in the operational group except the logical root:

receiving (806), by that compute node, the message (802) for broadcasting to all of the compute nodes in the operational group;

if that compute node is the physical root, then transmitting (810), by that compute node, the message (802) to all of the child nodes of the physical root except the child node from which the message (802) was received;

if that compute node received the message from the parent node for that compute node and if that compute node is not a leaf node, then transmitting (814), by that compute node, the message (802) to all of the child nodes of that compute node; and if that compute node received the message from a child node and if that compute node is not the physical root, then transmitting (818), by that compute node, the message (802) to all of the child nodes of that compute node except the child node from which the message was received and transmitting the message to the parent node of that compute node.

As provided above, the method of FIG. 9 includes receiving (806), by each compute node in the operational group except the logical root, the message (802) for broadcasting to all of the compute nodes in the operational group. Receiving (806), by each compute node, the message (802) for broadcasting to all of the compute nodes in the operational group according to the method of FIG. 9 may be carried out by receiving network packets from another compute node in the network and unencapsulating the message (802) from the network packets.

The method of FIG. 9 also includes determining (808), by each compute node in the operational group except the logical root, whether that compute node is the physical root. Each node may determine (808) whether that compute node is the physical root by comparing the node identifier for that node with the identifier for the physical root in the data communications network. If the node identifier for that node matches the identifier for the physical root, that compute node is the physical root. That compute node is not the physical root if the node identifier for that node does not match the identifier for the physical root.

As provided above, the method of FIG. 9 includes transmitting (810), by each compute node in the operational group except the logical root, the message (802) to all of the child nodes of the physical root except the child node from which the message (802) was received if that compute node is the physical root. In the method of FIG. 9, each compute node may transmit (810) the message (802) to all of the child nodes of the physical root except the child node from which the message (802) was received according to class routing instructions configured in each compute node.

The method of FIG. 9 includes determining (812), by each compute node in the operational group except the logical root, whether that compute node received the message from the parent node for that compute node and if that compute node is not a leaf node. Each compute node may determine (812) whether that compute node received the message from the parent node for that compute node according to the method of FIG. 9 by identifying the link on which the message was received and determining whether the identified link is connected to a parent node or a child node in the network topology. If the identified link on which the message (802) was received is connected to a parent node, then that compute node received the message from the parent node for that compute node. Each compute node may determine (812)

whether that compute node is a leaf node according to the method of FIG. 9 by identifying whether that node has any child nodes. If that node does not have any child nodes, that compute node is a leaf node. If that node does have child nodes, that compute node is not a leaf node.

As provided above, the method of FIG. 9 includes transmitting (814), by each compute node in the operational group except the logical root, the message (802) to all of the child nodes of that compute node if that compute node received the message from the parent node for that compute node and if that compute node is not a leaf node. In the method of FIG. 9, each node may transmit (814) the message (802) to all of the child nodes of that compute node according to class routing instructions configured in each compute node.

The method of FIG. 9 includes determining (816), by each compute node in the operational group except the logical root, whether that compute node received the message (802) from a child node. Each compute node may determine (816) whether that compute node received the message (802) from a child node according to the method of FIG. 9 by identifying the link on which the message was received and determining whether the identified link is connected to a parent node or a child node in the network topology. If the identified link on which the message (802) was received is connected to a child node, then that compute node received the message from the child node. If the identified link on which the message (802) was received is connected to a parent node, then that compute node received the message from the parent node.

As provided above, the method of FIG. 9 includes transmitting (818), by each compute node in the operational group except the logical root, the message (802) to all of the child nodes of that compute node except the child node from which the message was received and transmitting the message to the parent node of that compute node if that compute node received the message from a child node and if that compute node is not the physical root. In the method of FIG. 9, each node may transmit (818) the message (802) to all of the child nodes of that compute node except the child node from which the message was received and transmit the message to the parent node of that compute node according to class routing instructions configured in each compute node.

Exemplary embodiments of the present invention are described largely in the context of a fully functional parallel computer system for broadcasting a message in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of broadcasting a message in a parallel computer, the parallel computer comprising a plurality of compute nodes connected together using a multicast data communications network, the multicast data communications network optimized for collective operations, one compute node configured as a physical root in the data communications network, the compute nodes organized into at least one operational group of compute nodes for collective parallel operations of the parallel computer, and one compute node assigned to be a logical root for the operational group, the plurality of compute nodes comprising a plurality computer processors and computer memory operatively coupled to the computer processors, the method comprising:

transmitting, by the logical root to all of the compute nodes in the operational group directly connected to the logical root, a message for broadcasting to all of the compute nodes in the operational group, wherein the logical root and the physical root are different compute nodes within the parallel computer; and for each compute node in the operational group except the logical root:

receiving, by that compute node, the message for broadcasting to all of the compute nodes in the operational group;

if that compute node is the physical root, then transmitting, by that compute node, the message to all of the child nodes of the physical root except the child node from which the message was received;

if that compute node received the message from the parent node for that compute node and if that compute node is not a leaf node, then transmitting, by that compute node, the message to all of the child nodes of that compute node; and if that compute node received the message from a child node and if that compute node is not the physical root, then transmitting concurrently, by that compute node, the message to the parent node of that compute node and all of the child nodes of that compute node except the child node from which the message was received, wherein the plurality of compute nodes are also connected together through an additional data communications network optimized for point-to-point operations.

2. The method of claim 1 wherein:
the logical root is not a leaf node; and transmitting, by the logical root to all of the compute nodes in the operational group directly connected to the logical root, a message for broadcasting to all of the compute nodes in the operational group further comprises transmitting the message to all of the child nodes of the logical root and to the parent node of the logical root.

3. The method of claim 1 wherein:
the logical root is a leaf node; and transmitting, by the logical root to all of the compute nodes in the operational group directly connected to the logical root, a message for broadcasting to all of the compute nodes in the operational group further comprises transmitting the message to the parent of the logical root.

4. The method of claim 1 wherein the multicast data communications network connects the plurality of compute nodes together in a tree topology.

5. A parallel computer for broadcasting a message in the parallel computer, the parallel computer comprising a plurality of compute nodes connected together using a multicast data communications network, the multicast data communications network optimized for collective operations, one compute node configured as a physical root in the data communications network, the compute nodes organized into at least one operational group of compute nodes for collective parallel operations of the parallel computer, and one compute node assigned to be a logical root for the operational group, the plurality of compute nodes comprising a plurality of computer processors and computer memory operatively coupled to the computer processors, the computer memory having disposed within it computer program instructions capable of:
  transmitting, by the logical root to all of the compute nodes in the operational group directly connected to the logical root, a message for broadcasting to all of the compute nodes in the operational group, wherein the logical root and the physical root are different compute nodes within the parallel computer; and
  for each compute node in the operational group except the logical root:
    receiving, by that compute node, the message for broadcasting to all of the compute nodes in the operational group;
    if that compute node is the physical root, then transmitting, by that compute node, the message to all of the child nodes of the physical root except the child node from which the message was received;
    if that compute node received the message from the parent node for that compute node and if that compute node is not a leaf node, then transmitting, by that compute node, the message to all of the child nodes of that compute node; and
    if that compute node received the message from a child node and if that compute node is not the physical root, then transmitting concurrently, by that compute node, the message to the parent node of that compute node and all of the child nodes of that compute node except the child node from which the message was received, wherein the plurality of compute nodes are also connected together through an additional data communications network optimized for point-to-point operations.

6. The parallel computer of claim 5 wherein:
  the logical root is not a leaf node; and transmitting, by the logical root to all of the compute nodes in the operational group directly connected to the logical root, a message for broadcasting to all of the compute nodes in the operational group further comprises transmitting the message to all of the child nodes of the logical root and to the parent node of the logical root.

7. The parallel computer of claim 5 wherein:
  the logical root is a leaf node; and transmitting, by the logical root to all of the compute nodes in the operational group directly connected to the logical root, a message for broadcasting to all of the compute nodes in the operational group further comprises transmitting the message to the parent of the logical root.

8. The parallel computer of claim 5 wherein the multicast data communications network connects the plurality of compute nodes together in a tree topology.

9. A computer program product for broadcasting a message in a parallel computer, the parallel computer comprising a plurality of compute nodes connected together using a multicast data communications network, the multicast data communications network optimized for collective operations, one compute node configured as a physical root in the data communications network, the compute nodes organized into at least one operational group of compute nodes for collective parallel operations of the parallel computer, and one compute node assigned to be a logical root for the operational group, the plurality of compute nodes comprising a plurality of computer processors and computer memory operatively coupled to the computer processors, the computer program product disposed upon a recordable computer readable medium, the computer program product comprising computer program instructions capable of:
  transmitting, by the logical root to all of the compute nodes in the operational group directly connected to the logical root, a message for broadcasting to all of the compute nodes in the operational group, wherein the logical root and the physical root are different compute nodes within the parallel computer; and
  for each compute node in the operational group except the logical root:
    receiving, by that compute node, the message for broadcasting to all of the compute nodes in the operational group;
    if that compute node is the physical root, then transmitting, by that compute node, the message to all of the child nodes of the physical root except the child node from which the message was received;
    if that compute node received the message from the parent node for that compute node and if that compute node is not a leaf node, then transmitting, by that compute node, the message to all of the child nodes of that compute node; and
    if that compute node received the message from a child node and if that compute node is not the physical root, then transmitting concurrently, by that compute node, the message to the parent node of that compute node and all of the child nodes of that compute node except the child node from which the message was received, wherein the plurality of compute nodes are also connected together through an additional data communications network optimized for point-to-point operations.

10. The computer program product of claim 9 wherein: the logical root is not the physical root and the logical root is not a leaf node; and transmitting, by the logical root to all of the compute nodes in the operational group directly connected to the logical root, a message for broadcasting to all of the compute nodes in the operational group further comprises transmitting the message to all of the child nodes of the logical root and to the parent node of the logical root.

11. The computer program product of claim 9 wherein: the logical root is not the physical root and the logical root is a leaf node; and transmitting, by the logical root to all of the compute nodes in the operational group directly connected to the logical root, a message for broadcasting to all of the compute nodes in the operational group further comprises transmitting the message to the parent of the logical root.

12. The computer program product of claim 9 wherein the multicast data communications network connects the plurality of compute nodes together in a tree topology.

* * * * *